May 13, 1969  B. A. GRUBER  3,444,000
METHOD OF OPERATING FUEL CELL WITH A TAPE FEED CARRYING THE
REACTION COMPONENTS OF A THERMAL CELL
Filed March 29, 1966

INVENTOR.
BERNARD A. GRUBER
BY Lorna A Ferris
ATTORNEY

3,444,000
METHOD OF OPERATING FUEL CELL WITH A TAPE FEED CARRYING THE REACTION COMPONENTS OF A THERMAL CELL
Bernard A. Gruber, Boxford, Mass., assignor to Monsanto Research Corporation, St. Louis, Mo., a corporation of Delaware
Continuation-in-part of application Ser. No. 232,144, Oct. 22, 1962. This application Mar. 29, 1966, Ser. No. 538,286
Int. Cl. H01m 17/06, 21/14
U.S. Cl. 136—86
5 Claims This application is a continuation-in-part of my copending application Ser. No. 232,144, filed Oct. 22, 1962, now U.S. Patent No. 3,260,620.

This invention relates to fuel cells, and more particularly, provides a novel separator tape feed for a tape fuel cell and a novel method of operating such a cell with a tape feed, employing thermal cell electrochemical reaction components.

My copending, above-identified application provides a fuel cell wherein a tape separator is moved past the active electrode sites. The separator is preferably a dry tape carrier of the electrochemical reaction components. When the electrolyte or other electrochemical reaction component is fluid, as provided by the said application, the fluid is advantageously contained in rupturable capsules, to provide a dry tape feed for the cell. The capsules are ruptured to release the fluid as the tape moves past the active electrode sites.

Encapsulation of a fluid is not always convenient. The capsule walls add to the tape weight and bulk. The fluid can be released accidentally. Once the fluid is released, the tape is no longer dry.

Moreover, release of the fluid to the surrounding space is sometimes undesirable. Thus, release of fluorine gas as an oxidant creates a toxic atmosphere, and release of a liquid corrosive electrolyte may attack the current collectors at the active electrode sites. Access of the released fluid to the surrounding environment can be avoided by means such as encasing the tape, but this introduces complications by requiring the tape to be packaged.

It is an object of this invention to provide an improved method of operation of a fuel cell.

A particular object of this invention is to provide a novel tape separator for operation of a fuel cell.

Figure 1:
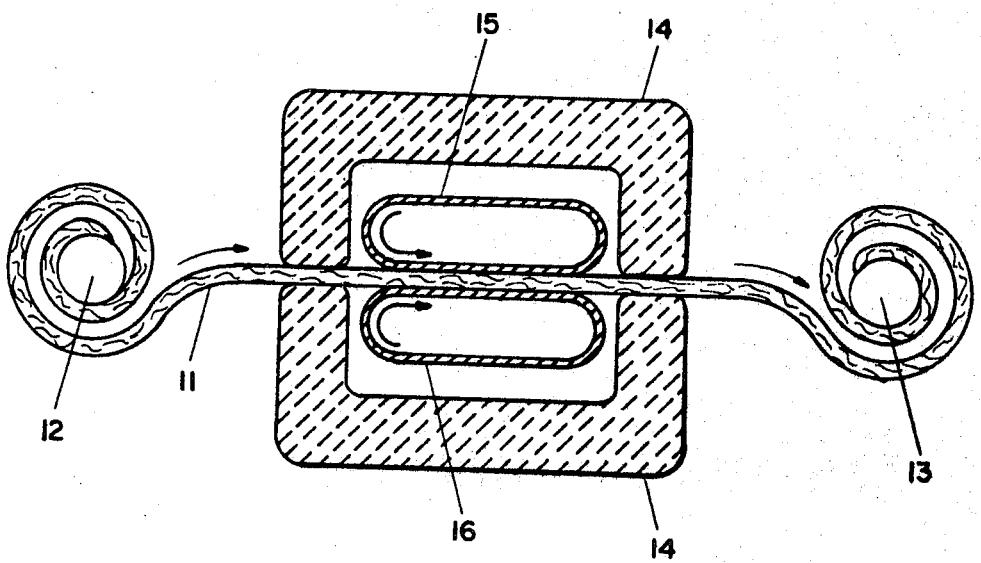
Figure 2:
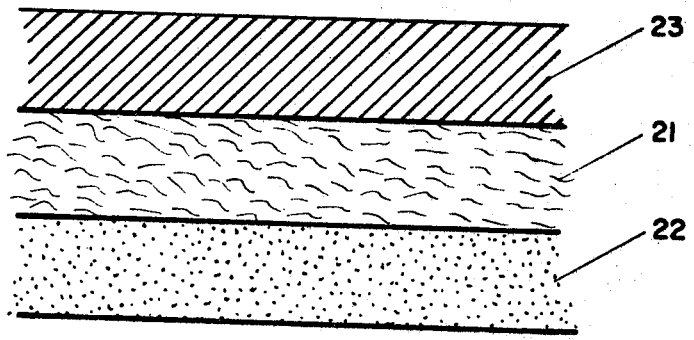

These and other objects will become apparent from the following description, considered in conjunction with the drawings in which:

FIGURE 1 is a diagrammatic vertical section of an embodiment of a fuel cell employing a moving tape separator in accordance with the invention; and FIGURE 2 is a diagrammatic horizontal section of a dry tape separator for a fuel cell in accordance with the invention.

In accordance with the present invention, there is provided a fuel cell wherein a tape separator is moved past the active electrode sites, providing a dry tape feed of thermal cell electrochemical reaction components.

A thermal cell includes only solid reaction components during storage. The fuel and oxidant are solids, and the electrolyte is a solid salt or salt mixture which is fusible. Heating to liquify the electrolyte activates the cell. Thus a tape separator feed for a fuel cell carrying thermal cell reaction components is completely dry prior to activation by heat. On cooling after moving past the active electrode sites, the reactants and reaction products carried by the tape can resolidify, providing a waste output from the cell which is also dry. While the electrolyte is liquified at the electrode sites, it can be embedded between the fuel an oxidant so as to prevent its access to the electrodes or current collectors.

Thus the present invention provides a dry tape cell system which does not involve the presence of fluid during storage, avoiding the necessity for encapsulating fluid to obtain a dry tape feed, and also avoiding the presence of released fluid at the active electrode sites.

Thermal cells usually operate only for short times, on the order of half a minute to a minute. Prolonged power output could be obtained from such cells by sequential firing (heating), but this requires good insulation between the cells to prevent the heat from being transmitted from one to the next.

With the tape cell, the tape supply of reaction components can be fed to the active electrode sites for power withdrawal in exactly the amount required. The tape roll or other storage device may be kept cool and unactivated, while the tape is heated to activate it only as it is fed to the active electrode sites. Thus, in effect the present invention provides a fuel cell, capable of prolonged operation.

By a fuel cell is meant a device for electrochemical generation of electricity which is provided with a continuous supply of the chemicals by the reaction of which the electricity is generated, and means to remove the products of reaction. A flashlight battery lasts no longer than its self-contained supply of the electrochemical reagents. An automobile battery depends on frequent periodic charging by a mechanical generator for prolonging its life. The theory of a fuel cell is that the cell will continue to deliver electricity for so long as the reactants are supplied to the cell and reaction products removed so as to maintain a substantially invariant system.

In practice, it has been found difficult to realize this ideal. One factor presenting particular difficulty in effective cell design is the seperator between the cell electrodes.

Use of stationary membranes as the seperators in fuel cells is often not entirely satisfactory. Their life is short, where active, strong chemical reagents are used as fuel cell materials. In thermal cells provided with supplies of reactants permitting prolonged operation, separator cracking has been a prime factor limiting the life of the cells.

Another item causing difficulty in fuel cell operation is polarization. This is a phenomenon which may be described as departure from thermodynamic ideality. It reduces the difference in potential between the two electrodes when current is flowing, reducing the amount of power the cell can generate. Thus the open circuit voltage of a cell may be high, but the drop in this potential difference when a load is applied by connection to an external circuit immediately reduces the voltage developed. Further polarization is observed as the cell is operated. The polarization increases as the current drain increases, so that at high loads, a cell may very quickly become too far polarized to deliver any substantial amount of power.

Still another difficulty sometimes of concern in fuel cell technology is design of conveniently transportable units. Gases, such as used in the hydrogen/oxygen cell, require heavy, bulky equipment for their transport and storage. Liquids are more convenient to use, but also can present problems. The possibility of spillage must be considered in design of portable cells. Gravity feed cannot be depended on when the cell may be tipped while being operated, or in environments where the cell must operate independently of gravity, in space capsules or the like.

Fuel cells are inherently dynamic systems, which necessarily provide for the inflow and outgo of reactants and products. Yet designs for them have ordinarily taken the static approach of the closed systems of conventional LeClanche cells and the like. The electrode separator of a fuel cell is a part which has conventionally been designed for static operation. By provision of a separator which moves past the active electrode sites in a fuel cell, it is found that a variety of considerable advantages can be gained.

What is meant herein by the active electrode site is the site of the introduction or withdrawal of electrons to or from the electrolyte. The term electrode is sometimes given this restrictive meaning, but is generally used to designate, broadly, a device for the accomplishment of this result. Most of the electrode, in this broader sense of the term, is a current collector, with the function of conducting electrons to or from the site of their exchange with the electrolyte.

In the fuel cells employing moving separators as provided hereby, as will become evident hereinafter, the functions of current collector and producing exchange of electrons with the electrolyte may require distinction, in some cases. For the purposes of discussion, the portion of the electrode actively participating in the electron/ electrolyte exchange may be identified as the active electrode, and the remainder of the conductive material, as passive electrode. The active electrode material may actually be carried to the site of the electrochemical reaction by the separator, as will be seen from the following discussion, whereby it becomes the active electrode when the separator contacts the current collector and provides the electrolytic path between the active electrode sites.

The tape separator will be arranged so that after passage between electrodes, it exits from the electrochemical zone to be treated as cell operational waste. It can thus be made of inexpensive porous material, which will permit ion transfer while preventing direct mixing of the fuel and oxidant reactants. Porous separators with pores of sufficient size to permit physical transport of chemical molecules eventually permit the reactants to diffuse through and mix. But if the porous separator is continually moved away from the electrode zone to which the reactants are fed, before the reactants have travelled completely through the separator, then this mixing of the reactants is prevented.

Moreover, this invention can advantageously be applied in a fuel cell including highly reactive materials. By employing a disposable separator, so that before attack of the fuel cell reactant on the separator has proceeded far enough for the separator to fail, the portion of the separator exposed to this reactant has been moved away and out of the cell, the problem of separator failure is alleviated.

As discussed above, a significant factor in preventing optimum performance of fuel cells is polarization of the electrodes. The polarization can be shown to be made up of several different components, one of which is concentration polarization. Concentration polarization produces mass transfer limitations on the performance of the electrodes. A finite amount of time is required for the reactants to reach active sites at the electrode where they can undergo the electrochemical reaction (oxidation or reduction) and to be removed from such active sites, leaving the sites available for further reactant to occupy them.

The movement of the separator to and away from the electrodes can assist in conducting this process of reactant transfer. The process of diffusion is supplemented by a physical transporting action. The tape can transport reactants to the electrodes and pick up intermediate or ultimate reaction products and assist in conveying them away from the electrode.

The electrodes can be arranged to rotate while the moving separator runs between them. Thus for example the friction of the separator moving between the electrodes, set under proper tension, can cause appropriately mounted electrodes to rotate so that the point at which the electrodes contact each other is continually changing. This means that the active portion of the electrode is continually being moved away from the electrochemical reaction site, and allowed to rest (depolarize) until the rotating movement has carried it back to the electrochemical site. It is known that polarization decreases and eventually disappears when an electrode is out of operation. With the active portion of rotating electrodes continually changing, the remainder of the electrode is continually being held out of operation, thus alleviating polarization.

Still another carrier aspect of the tape separator of this invention can be action in the removal of waste products from the cell. To the extent that byproducts and waste products are continually drawn from the fuel cell operating chamber as they are generated, improvements in fuel cell operations can be obtained. This removal can be effected by the frictional action of the movement of the tape itself. It may also be accomplished by this movement in conjunction with other arrangements as discussed above: for example, use of rotating electrodes, which can be combined if desired with a doctor blade scraping the electrodes as they rotate.

Dry tape carriers of fuel cell reactants offer still further advantages. The presence of free liquid in the cell can be effectively eliminated, to achieve the advantages of a dry cell, which operates independently of gravity or of the position of the cell.

Not only may the electrolyte, fuel and oxidant components of a fuel cell system be supplied to the electrodes by a moving tape system, but indeed, what may be regarded as the electrode itself may be provided by the tape.

The fuel in a thermal cell is usually a conductive metal, such as magnesium, which is a consumable anode material. A magnesium coating may readily be applied to one side of a separator tape, producing a laminated tape on which the magnesium is supplied as fuel to the electrochemical reaction site.

When a laminate of the stated nature is used, the device at the anode site in the cell need be no more than a current collector. For example, it can be simply an electrically conductive contact, made of carbon, nickel or the like, able to pick up and conduct away the electrons as they are released by solution of the metal in the electrolyte.

Similarly, a cathodic current collector, made of conductive materials as described such as carbon, may be used in conjunction with a tape carrying an active electrode material such as conductive carbon, carrying an oxidant such as iron oxide and impregnated with a KCl-LiCl mixture as electrolyte. If the iron oxide is sufficiently conductive, the carbon can be omitted.

An active anode material such as a metal like magnesium and an active cathode material such as a conductive iron oxide function respectively as a fuel and as an oxidant, as well as functioning as active electrode materials. They are thus consumable electrode materials.

The tape carrier approach is not limited to consumable electrodes, either. While cathode and anode materials such as carbon and noble metals may be referred to as "inert," the nature of the electrode is recognized to have a definite, pronounced effect on the facility with which electrochemical reactions proceed. Factors involved in this may include catalytic activity of the electrode material in promoting the electrochemical reaction, effect of porosity in providing reaction sites and so forth. One of the factors involved in polarization of electrodes (decline in potential developed by the cell) seems to be an effect of saturation of active sites.

Active electrode materials such as platinum can be applied to tapes in very thin coatings by methods such as sputtering. An oxidant on the tape such as $\alpha$-$Fe_2O_3$ can be mixed with an active electrode material such as conductive carbon. The tape can thus carry a continuously fresh electrode surface to the electrochemical reaction site. As a result, the limits on the rate at which an electrode can deliver current by lack of sufficiently rapidly available reaction sites can be avoided. Again, here, the device at the reaction site can be merely a current collector, with the tape carrying the active electrode surface to it.

Indeed, as will be readily evident from the foregoing, the moving separator tape can advantageously carry every active component of the fuel cell, including fuel, oxidant, electrolyte and on top of this, the active electrode surfaces (including catalysts), all in one package.

The tape can also carry an igniting composition, such as thermite or a Zr powder-Ba chromate mixture, to supply heat at the electrodes or current collectors. This can be applied to the tape at only the initial section, and arrangements made to continue heating the tape at the current collectors by other means. For example, heat can be generated by reaction of materials on the tape, such as exothermal chemical reaction of an oxidant with a fuel, one or both of which may be the same as the electrochemical oxidant and fuel, with suitable arrangements to produce their contact. Heat can also be supplied from the tape electrically, by using part of the electrical power it generates to heat an electrical resistance at the current collectors. Alternatively, the tape can be coated over its length by the igniting composition, to supply heat as it progresses. Friction can be used to set off the igniting composition, or it can be fired by an electrical match, for example.

Referring now in further detail to the embodiments of the invention illustrated in the drawings, FIGURE 1 represents a fuel cell with a moving electrode separator tape in accordance with this invention, in diagrammatic vertical section. Here a moving separator tape 11 made of glass fibers for example, impregnated with a 58 mole-percent LiCl, 42 mole-percent KCl eutectic mixture and covered on one surface by a layer of magnesium and on the other, by a mixture of $Fe_2O_3$ and conductive carbon black, is passed from supply roll 12 to take-up reel 13. The path taken by the separator tape goes through oven 14 containing current collectors 15 and 16. These are rotating bands which engage and pull the separator tape through between them. The oven 14 is provided with a heat source, such as an electrical resistance heater powered by part of the tape output. Leads (not shown) connect the current collectors to an external circuit. As the tape enters the oven, the electrolytic mixture melts, and the electrochemical reaction takes place, generating electricity at the current collectors.

FIGURE 2 is a diagrammatic cross-section of a tape as provided by this invention, in which 21 is the tape separator base, impregnated with electrolyte such as the fusible KCl-LiCl mixture described above, 22 is a coating of a mixture of $Fe_2O_3$ and conductive carbon on the tape, and 23 is a layer of magnesium adhered to the tape.

Materials which can be used as the tape separator base are electrolytically permeable substances. A preferred class are felts of fibers resistant to heat and to chemicals such as silicon carbide and asbestos, glass or the like. Woven constructions, comprising cloth such as glass cloth, can also be used.

In references to a tape herein, what is meant is a structure having two dimensions which are very large in relation to the third dimension, such as a sheet, the width and length of which are very much greater than the thickness. The width of the tape, furthermore, is usually desirably small in relation to its length.

The weight of reactants applied per area of tape surface will vary depending on the intended current drain. Surprisingly small amounts are needed. For example, using a one-inch width tape, five amperes can be generated with a tape draw rate of 1 inch per minute by a layer of magnesium only .0024 centimeter thick. With the same rate of draw and current drain, the weight of iron oxide ($Fe_2O_3$) consumed may be only 0.14 gram per inch.

Metallic coatings may be applied to the base by a variety of methods, to provide a consumable anode material. A base may be sputter-coated with a metal like magnesium or zinc, or it may be laminated to a metal foil such as aluminum foil, using hide glue, ethyl cellulose, or like adhesives. Metallic coatings on the tape may also comprise catalytically active electrode materials such as platinum, palladium, or the like, applied by means such as those above mentioned.

Coatings on the tape may also comprise dry solid electrochemical reaction components other than the consumable anode metals, such as conductive carbon black or other active electrode materials and powdered fuels, oxidants and electrolytes which are solid at room temperature. The tape coating may also include fibers, such as graphite fibers, to improve cohesion of the coatings. Application of such dry solids to a tape base can conveniently be effected by means conventional in the art for coating paper, such as mixing the dry solid with an adhesive solution and applying it to the tape base surface. The adhesive employed, for example, may conveniently be a polymer such as polyvinyl alcohol.

The coatings comprising fuel cell reaction components will be suitably applied to the tape so that in use, the tape base will be wetted by melting of the salt electrolyte, fuel will be provided on one face of the base at the anode and in contact with the electrolyte, and oxidant will be provided on the opposite face, contacting the cathode and in contact with the electrolyte. Thus for example, the tape may be provided with a plurality of coatings, such as a face of magnesium on an asbestos base coated on the opposite face with a first layer of dry KCl-LiCl mixture and a second layer upon this of $Fe_2O_3$ and C, disposed so that on heating, the electrolyte melts and soaks into the base to reach the magnesium face. Separate layers will often not be essential: for example, the electrolyte and oxidant may usually be mixed in a single layer, and so forth.

When the tape additionally carries other substances than thermal cell electrochemical reaction components, such as igniting compositions and exothermally reacting materials, these can be applied to the tape similarly. For example, a powdered metal such as Zr can be mixed with oxidant coated onto the tape, to react exothermally with part of the oxidant in order to supply heat at the current collectors. An igniting composition can be striped onto the tape separator base alongside the electrochemical reactants, and adhered to it similarly, by an adhesive.

The fuel cells in which the separator tapes of the invention are employed may comprise any suitable current collectors as the material leading to the point where the electrodes are placed in electrical contact through the tape separator. Where the current collectors comprise the electrodes, they are desirably not only conductive materials but also adsorb the reactants employed, and act as catalyst for the electrode reactions. Suitable current collector and electrode materials include conductive carbon and copper, noble metals such as platinum, palladium, iridium, rhodium and the like, transiton metals such as nickel, and so forth. The electrode surface can advantageously be activated, by deposition of a porous material such as platinum or palladium black, which can be deposited if desired on plates of metals such as stainless steel, iron or the like to form the electrode. Metal oxides such as oxides of iron, magnesium, cobalt, copper and the like may also be used as activating electrode surfaces. The electrode or current collector materials may be used in sheet form or in the form of screens, meshes or other types of porous bodies, or as rollers, rings, or like configurations. Preferably, they have elongated surfaces, to minimize current density.

The current collectors or electrodes will advantageously be enclosed in an insulated box or oven, to conserve heat. This can be heated from an external source or from the tape, as described above. If excessive heat is conducted out of the oven by the tape feed, means such as a heat sink can be provided outside the oven to cool the tape prior to entry into the oven, so that it is not activated prematurely. Means can also be provided for advancing the tape through the cell, such as spikes on rotating band current collectors which engage the tape; the rotation of the bands can be powered by an electric motor driven by part of the electrical output of the cell, for example. In general, the tape will be advanced substantially continuously to the active electrode sites during operation of the cell, to provide the substantially invariant power output characteristic of fuel cell operation. The coatings on the tape (including foils laminated to the tape and carried by it) may be continuous, or may be interrupted, to prevent flashback along a coating of an igniting composition extending along the tape length.

As will be apparent from the foregoing discussion, any of a wide variety of fuels, electrolytes and oxidants may be employed in fuel cells embodying a mobile tape separator in accordance with this invention. Description of useful thermal cell reaction components are extensively available in published literature.

The fuel is usually a metal, and in this connection, metals which may be employed as consumable anodes are generally designated anode metals and include for example the alkali metals such as lithium, sodium, potassium, Group I–A metals such as copper and silver, Group II metals such as magnesium, calcium, strontium, zinc and cadmium, Group III metals such as aluminum, Group IV metals such as tin, and so forth. The metals may be used individually or in mixtures such as the alloy of sodium with tin, the alloy $Li_4Pb$, or a Mg-Li-Al alloy.

As oxidants, various oxides (reducible compounds having one or more oxygen atoms, including peroxides) are useful. Illustrative of inorganic oxides which may be employed are salts such as sodium peroxide, potassium peroxide, vanadium pentoxide, iron oxides (e.g., $Fe_2O_3$ or $Fe_3O_4$), copper oxides, manganese dioxide, $B_2O_3$, $MoO_3$, tungstic oxide, uranium oxide and the like. Also included in this group are salts of oxy acids such as sodium, potassium, lithium, barium, magnesium or calcium chromates, perchlorates, permanganates, phosphates and the like. Mixtures such as $B_2O_3$ plus $V_2O_5$ are also useful. If desired, the oxidant can be a metal more electropositive than the anode metal, such as copper, nickel or silver, used with an anode metal such as magnesium. Use of a metal oxidant can be combined with inclusion of the corresponding metal halide and an oxidant in the electrolyte, making possible an electrode process in which the halide is reduced to the metal and oxidation of the metal regenerates the halide. Halides such as $BiCl_3$ or CuCl can also be used.

Electrolytic connection between the anode and cathode of fuel cells operating at relatively high temperatures such as above 150° C. is generally provided by melts of an ionizing compound, which may be a single salt, but is usually a mixture, to provide a lower melting point. The salts used can be the halides (bromides or chlorides), the thiocyanates or the nitrates of Ca, Na, K, Li, Ni or other metals. Mixtures of hydroxides and halides such as LiOH-LiCl can also be used. Sometimes solid organic electrolytes can be used, such as acetamide (m. 176° F.) mixed with salts such as about 20% of KCl, LiCl, NaCl, $Li_2CO_3$ or $Li_2SO_4$.

While the invention has been described with reference to various particular preferred embodiments thereof, it is to be understood that variations and modifications can be made without departing from the scope of the present invention, which is limited only as defined in the following claims.

What is claimed is:

1. The method of operating a fuel cell comprising moving a dry electrolytically permeable tape separator cell feed carrying the reaction components of a thermal cell past current collectors at which heat melts a solid electrolyte carried by the separator.

2. The method of claim 1, in which the tape separator is made of a heat-resistant material and carries an anode metal on one side and a fusible salt electrolyte and an oxidizing agent on the other side.

3. The method of claim 2, in which said metal is magnesium, said salt is a KCl-LiCl eutectic, and said oxidizing agent is ferric oxide.

4. The method of claim 1 in which the tape separator also carries an igniting composition to the current collectors, which supplies heat to melt the electrolyte.

5. The method of claim 1 in which the tape separator carries exothermally reacting materials to the current collectors, which supply heat to melt the electrolyte.

References Cited

UNITED STATES PATENTS

| | | | |
|---|---|---|---|
| 2,751,427 | 6/1956 | Woodring | 136—83 X |
| 2,786,088 | 3/1957 | Robinson | 136—83 |
| 2,970,180 | 1/1961 | Urry | 136—153 X |
| 3,079,454 | 2/1963 | McGinnis | 136—153 X |
| 3,119,723 | 1/1964 | Crouthamel et al. | 136—86 |
| 3,260,620 | 7/1966 | Gruber | 136—6 |

WINSTON A. DOUGLAS, *Primary Examiner.*

A. SKAPARS, *Assistant Examiner.*

U.S. Cl. X.R.

136—6, 83, 90, 114